United States Patent
Mayr et al.

(10) Patent No.: US 12,380,110 B2
(45) Date of Patent: Aug. 5, 2025

(54) TABLE SCAN PREDICATE WITH INTEGRATED SEMI-JOIN FILTER

(71) Applicant: SAP SE, Walldorf (DE)

(72) Inventors: Manuel Mayr, Walldorf (DE); Wolfgang Stephan, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/350,575

(22) Filed: Jul. 11, 2023

(65) Prior Publication Data
US 2025/0021565 A1    Jan. 16, 2025

(51) Int. Cl.
*G06F 16/30* (2019.01)
*G06F 16/215* (2019.01)
*G06F 16/2453* (2019.01)
*G06F 16/2455* (2019.01)

(52) U.S. Cl.
CPC ........ *G06F 16/2456* (2019.01); *G06F 16/215* (2019.01); *G06F 16/24544* (2019.01)

(58) Field of Classification Search
CPC ............... G06F 16/2456; G06F 16/215; G06F 16/24544
See application file for complete search history.

(56) References Cited

U.S. PATENT DOCUMENTS

| | | | |
|---|---|---|---|
| 6,397,204 B1* | 5/2002 | Liu | G06F 16/24544 |
| 2008/0215556 A1* | 9/2008 | Surna | G06F 16/245 |
| 2019/0220464 A1* | 7/2019 | Butani | G06F 16/24542 |
| 2023/0244666 A1* | 8/2023 | Mathew | G06F 16/2456 |
| | | | 707/718 |

OTHER PUBLICATIONS

Ashdown Lance et al., "Database SQL Tuning Guide—5 Query Transformations." Jul. 31, 2017. (Available at https://docs.oracle.com/database/121/TGSQL/tgsql_transform.htm#TGSQL94846), 35 Pages.
Extended European Search Report issued in European Application No. 24184001.6-1203,mailed Dec. 5, 2024, 12 pages.

* cited by examiner

*Primary Examiner* — Khanh B Pham
(74) *Attorney, Agent, or Firm* — Mintz Levin Cohn Ferris Glovsky and Popeo, P.C.

(57) ABSTRACT

A system and method is provided for implementing a table scan predicate with integrated semi-join filter. The method includes receiving a query including a request to join first data from a first dimension table and second data from a second dimension table with fact data from a fact table. The method includes applying a first dynamic predicate to the first data by collecting the first data based on a first expression of the query and filtering the first column. The method also includes applying a second dynamic predicate to the second data by collecting the second data based on a second expression of the query and filtering the second column. The method also includes executing the query by at least scanning the fact table based on the query, the first filtered column, and the second filtered column.

13 Claims, 8 Drawing Sheets

700

```
┌─────────────────────────────────────────────────────────────────┐
│ RECEIVING A QUERY INCLUDING: A REQUEST TO JOIN FIRST DATA FROM A │
│   FIRST DIMENSION TABLE AND SECOND DATA FROM A SECOND            │
│       DIMENSION TABLE WITH FACT DATA FROM A FACT TABLE           │
│                              702                                 │
└─────────────────────────────────────────────────────────────────┘
                                 │
┌─────────────────────────────────────────────────────────────────┐
│       APPLYING A FIRST DYNAMIC PREDICATE TO AT LEAST FIRST DATA  │
│                              704                                 │
└─────────────────────────────────────────────────────────────────┘
                                 │
┌─────────────────────────────────────────────────────────────────┐
│      APPLYING A SECOND DYNAMIC PREDICATE TO AT LEAST THE SECOND  │
│                              DATA                                │
│                              706                                 │
└─────────────────────────────────────────────────────────────────┘
                                 │
┌─────────────────────────────────────────────────────────────────┐
│ EXECUTING THE QUERY BY AT LEAST SCANNING THE FACT TABLE BASED    │
│ ON THE FIRST PREDICATE, THE SECOND PREDICATE, FILTERED FIRST DATA│
│   FROM THE APPLICATION OF THE FIRST DYNAMIC PREDICATE, AND       │
│  FILTERED SECOND DATA FROM THE APPLICATION OF THE SECOND         │
│                      DYNAMIC PREDICATE                           │
│                              708                                 │
└─────────────────────────────────────────────────────────────────┘
```

FIG. 7

TABLE SCAN PREDICATE WITH INTEGRATED SEMI-JOIN FILTER

TECHNICAL FIELD

The subject matter described herein relates generally to database management and more specifically to a table scan predicate with an integrated semi-join filter for use in a semi-join reduction in scenarios including multiple input sources.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for a table scan predicate with an integrated semi-join filter for use in a semi-join reduction. In one aspect, there is provided a system. The system may include at least one data processor and at least one memory. The at least one memory may store instructions that result in operations when executed by the at least one data processor. The operations may include: receiving a query including a request to join first data from a first dimension table and second data from a second dimension table with fact data from a fact table. The query further includes: a first predicate including a first expression associated with the first data and a first reference to a first column associated with the fact data from the fact table, a second predicate including a second expression associated with the second data and a second reference to a second column associated with the fact data from the fact table, and a third predicate for use in a table scan of the fact table. The operations also include applying a first dynamic predicate associated with the first dimension table to at least the first data by at least collecting the first data based on the first expression and filtering the first column based on a first value identifier mapped to at least one vector of data representing the collected first data. The first dynamic predicate includes a transformation of the first predicate for execution of the query. The operations also include applying a second dynamic predicate associated with the second dimension table to at least the second data by at least collecting the second data based on the second expression and filtering the second column based on a second value identifier mapped to at least one vector of data representing the collected second data. The second dynamic predicate includes a transformation of the second predicate for execution of the query. The operations also include executing the query by at least scanning the fact table based on the first predicate, the second predicate, the first filtered column, and the second filtered column.

In another aspect, a computer-implemented method may also be provided. The method includes: receiving a query including a request to join first data from a first dimension table and second data from a second dimension table with fact data from a fact table. The query further includes: a first predicate including a first expression associated with the first data and a first reference to a first column associated with the fact data from the fact table, a second predicate including a second expression associated with the second data and a second reference to a second column associated with the fact data from the fact table, and a third predicate for use in a table scan of the fact table. The method also includes applying a first dynamic predicate associated with the first dimension table to at least the first data by at least collecting the first data based on the first expression and filtering the first column based on a first value identifier mapped to at least one vector of data representing the collected first data. The first dynamic predicate includes a transformation of the first predicate for execution of the query. The method also includes applying a second dynamic predicate associated with the second dimension table to at least the second data by at least collecting the second data based on the second expression and filtering the second column based on a second value identifier mapped to at least one vector of data representing the collected second data. The second dynamic predicate includes a transformation of the second predicate for execution of the query. The method also includes executing the query by at least scanning the fact table based on the first predicate, the second predicate, the first filtered column, and the second filtered column.

In another aspect, there is provided a computer program product including a non-transitory computer readable medium storing instructions. The instructions may cause operations may executed by at least one data processor. The operations may include: receiving a query including a request to join first data from a first dimension table and second data from a second dimension table with fact data from a fact table. The query further includes: a first predicate including a first expression associated with the first data and a first reference to a first column associated with the fact data from the fact table, a second predicate including a second expression associated with the second data and a second reference to a second column associated with the fact data from the fact table, and a third predicate for use in a table scan of the fact table. The operations also include applying a first dynamic predicate associated with the first dimension table to at least the first data by at least collecting the first data based on the first expression and filtering the first column based on a first value identifier mapped to at least one vector of data representing the collected first data. The first dynamic predicate includes a transformation of the first predicate for execution of the query. The operations also include applying a second dynamic predicate associated with the second dimension table to at least the second data by at least collecting the second data based on the second expression and filtering the second column based on a second value identifier mapped to at least one vector of data representing the collected second data. The second dynamic predicate includes a transformation of the second predicate for execution of the query. The operations also include executing the query by at least scanning the fact table based on the first predicate, the second predicate, the first filtered column, and the second filtered column.

In some variations of the methods, systems, and non-transitory computer readable media, one or more of the following features can optionally be included in any feasible combination. The operations and/or method includes transforming the first predicate into the first dynamic predicate by at least converting the first predicate to a first child node of the table scan, and transforming the second predicate into the second dynamic predicate by at least converting the second predicate to a second child node of the table scan. The table scan is configured to perform the scanning of the fact table. The transforming further includes: including the first predicate as a child node of the table scan in conjunction with the first dynamic predicate, and including the second predicate as another child node of the table scan in conjunction with the second dynamic predicate.

In some variations, collecting the first data includes parallelizing the first data. The applying the first dynamic predicate further includes merging, after collecting the first data, the first data. Collecting the second data includes parallelizing the second data. The applying the second dynamic predicate further includes merging, after collecting the second data, the second data.

In some variations, the merging the first data includes uniquifying the first data, and the merging the second data includes uniquifying the second data the merging the first data comprises uniquifying the first data. The merging the second data includes uniquifying the second data.

In some variations, the uniquifying the first data includes removing duplicate values from the at least one vector of data representing the collected first data. The uniquifying the second data includes removing duplicate values from the at least one vector of data representing the collected second data.

In some variations, the filtering the first column includes removing, from the fact table, at least one row that does not correspond to the first value identifier, and the filtering the second column includes removing, from the fact table, at least one row that does not correspond to the second value identifier.

In some variations, the first dynamic predicate and the second dynamic predicate are implemented as a semi-join reduction to reduce a number of rows in at least the fact table for use in the scanning of the fact table.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 depicts a flowchart illustrating a process for executing a query, in accordance with some example embodiments.

When practical, similar reference numbers denote similar structures, features, or elements.

DETAILED DESCRIPTION

Figure 1:
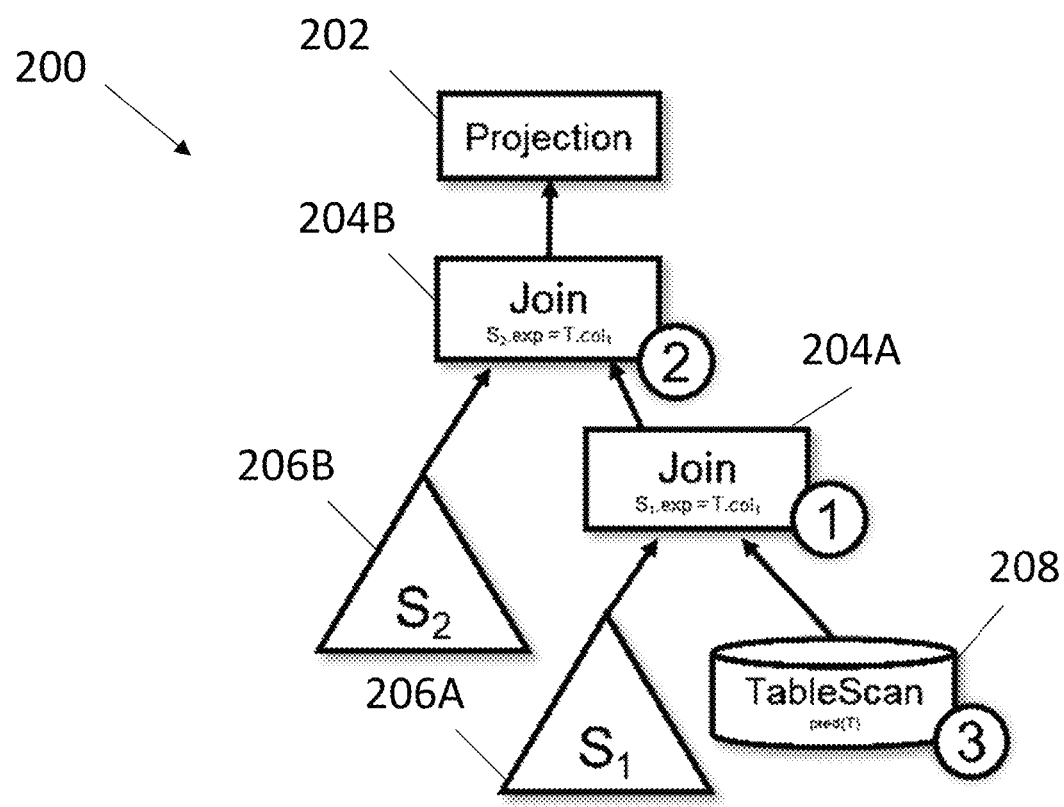
FIG. 1 depicts an example logical representation of a query, in accordance with some example embodiments.

Database management systems and operations performed on the data managed by a database management system have become increasingly complex. For example, a database management system (or database for short) can support relatively complex online analytical processing (OLAP), which can perform multi-dimensional analysis, to more straightforward transaction based online transaction processing (OLTP). Moreover, the database may be configured as a row-store database or column-store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

Joining methods may be used in query processing and optimization for distributed databases. When processing and/or optimizing queries in distributed databases, data needs to be transferred between databases located in different sites. Such join operations can be computationally expensive depending on the amount of data that needs to be transferred. Thus, query optimization can be used to minimize the amount of data transferred between sites and processed during execution of the queries.

To optimize execution of the query, and to reduce the amount of data scanned and/or transferred between sites during join operations, semi-join reduction techniques may be used. For example, a semi-join may be used for processing a join between tables more quickly. In particular, a left-semi-join may be used to return rows in a left table (e.g., a left side of the predicate) of a join at most once. In other words, even if the right table (e.g., a right side of the predicate) of the join contains two matches for a row in the left table, only one copy of the row from the left table will be returned. Thus, processing a semi-join may include searching the right table for matches in the left table and returning only a single row from the left table for each of the matches without duplicates.

For semi-joins involving tables stored at different sites (e.g., hosts), data transfer cost may be reduced by first sending only the projected join column(s) to the other site, where it is joined with the second relational table. Then, all matching tuples from the second relation are sent back to the first site to compute the final join result.

As an example, a query may include a request (e.g., S ⋈ T) to join relational tables S and T. Semi-join reduction techniques can eliminate dangling tuples from table S to more efficiently and/or quickly process the request with less computing resources. A dangling tuple may include a tuple (e.g., a row in a table), such as a tuple in table S, that does not match with any tuple in table T. In relational algebra, this is captured by the following law: S ⋈ (T ⋉ S)=S ⋈ T. The operation T ⋉ S (e.g., table T left semi-join table S) in this context is an operation to eliminate every tuple in table S that does not have a matching (e.g., a corresponding) row in table T. Depending on the query predicates, the query criteria, and/or on the storage format (e.g., dictionary-compressed columnar format or otherwise) of the data in the table, this operation may be computationally cheap and may greatly reduce the number of tuples from table T that are considered during execution of the request to join tables S and T (e.g., the join operation).

Further, some systems used for semi-join reduction are confined to a single input source, which limits the efficiency of the systems in processing queries. In contrast, database management system described herein can accommodate any number (e.g., an arbitrary number) of input source relations. Consistent with embodiments of the current subject matter, the database management system described herein may maximize efficiency in semi-join reduction to aid in processing queries, such as queries that include a join operation with multiple input source relations. To do so, the database management system may employ multiple filters corresponding to each of the input sources. In other words, the database management system may generate and use a dynamic predicate (e.g., a table scan predicate with integrated semi-join filter) for each of the input sources. This corresponds to a left semi-join that allows a tuple of arbitrary relations on the right-hand side (e.g., with respect to input source tables $S_1 \ldots S_n$) in the following relation: $T \ltimes (S_1, \ldots, S_n) = \{t | t \in T \wedge s_1 \in S_1 \wedge \ldots \wedge s_n \in S_n, t[J_1] = s_1[J_1] \wedge \ldots \wedge t[J_n] = s_n[J_n]\}$, where $t[J_i] = s_i[J_i]$ denotes the tuple-wise comparisons of the rows at their respective join attributes $J_i$. This means that $S_1, \ldots, S_n$ acts as a filter to reduce the amount of entries (e.g., tuples) from Table S that need to be considered in a join operation $T \bowtie S_1 \bowtie \ldots \bowtie S_n$. By applying the multi-source semi-join described herein, this relation transforms to $T \bowtie S_1 \bowtie \ldots \bowtie S_n = (T \ltimes (S_1, \ldots, S_n)) \bowtie S_1 \bowtie \ldots \bowtie S_n$.

The dynamic predicate for each of the input sources may be injected into existing predicates of a table scan, such as by using a conjunction to eliminate or reduce dangling tuples, such as in Table T. The described configurations may target analytical queries operation on relations organized in star schema—a large fact table (e.g., Table T) and smaller dimension tables (e.g., Tables $S_1$, $S_2$, etc.). Accordingly, the database system described herein may significantly reduce the number of rows of the fact table (e.g., Table T) that are considered during a join. This leverages the probabilities and selectivity of using multiple dimension tables to improve query execution performance.

The configurations described herein may additionally and/or alternatively allow for column store-specific optimization such as for value identifier (e.g., valueid) processing. In some examples, for a dictionary-compressed column, the value identifier is the index into the dictionary, thus allowing efficient integer representation and processing of table data and predicate values. Further, the dynamic predicate described herein may include at least one value list (e.g., ValueList) operator that considers values that are not known at compile time, but are gathered at query execution time. According to some embodiments, a separate dynamic predicate may be created and associated for each input source, which may include a dimension table. For example, the dynamic predicate may be applied to the data stored in the corresponding dimension table by at least collecting values from a corresponding expression included in the query and by filtering a column in the fact table based on value identifiers corresponding to the collected values. The database management system may thus pre-filter the data scanned during execution of the query. Accordingly, the database management system described herein may improve query processing speeds and efficiency.

FIG. 1 depicts an example logical representation 200 of a query, in accordance with some example embodiments. In some embodiments, a database management system 100 (see FIG. 8) may include an execution engine 150 that may be configured to receive the query, generate a query plan (including for example query algebra) which may be depicted by the logical representation 200, optimize the query plan, and/or generate executable code, as discussed herein, and discussed in more detail with respect to FIG. 8. The database management system 100 may also include a query optimizer 110 and/or a query execution engine 112 that performs one more operations of a query, such as before or during execution of a query execution plan. The query optimizer 110 and/or the query execution engine 112 (which may include pre-compiled code and/or generated executable code) may define an application that is part of or separate from the execution engine 150 that handles processing of the query.

Figure 8:
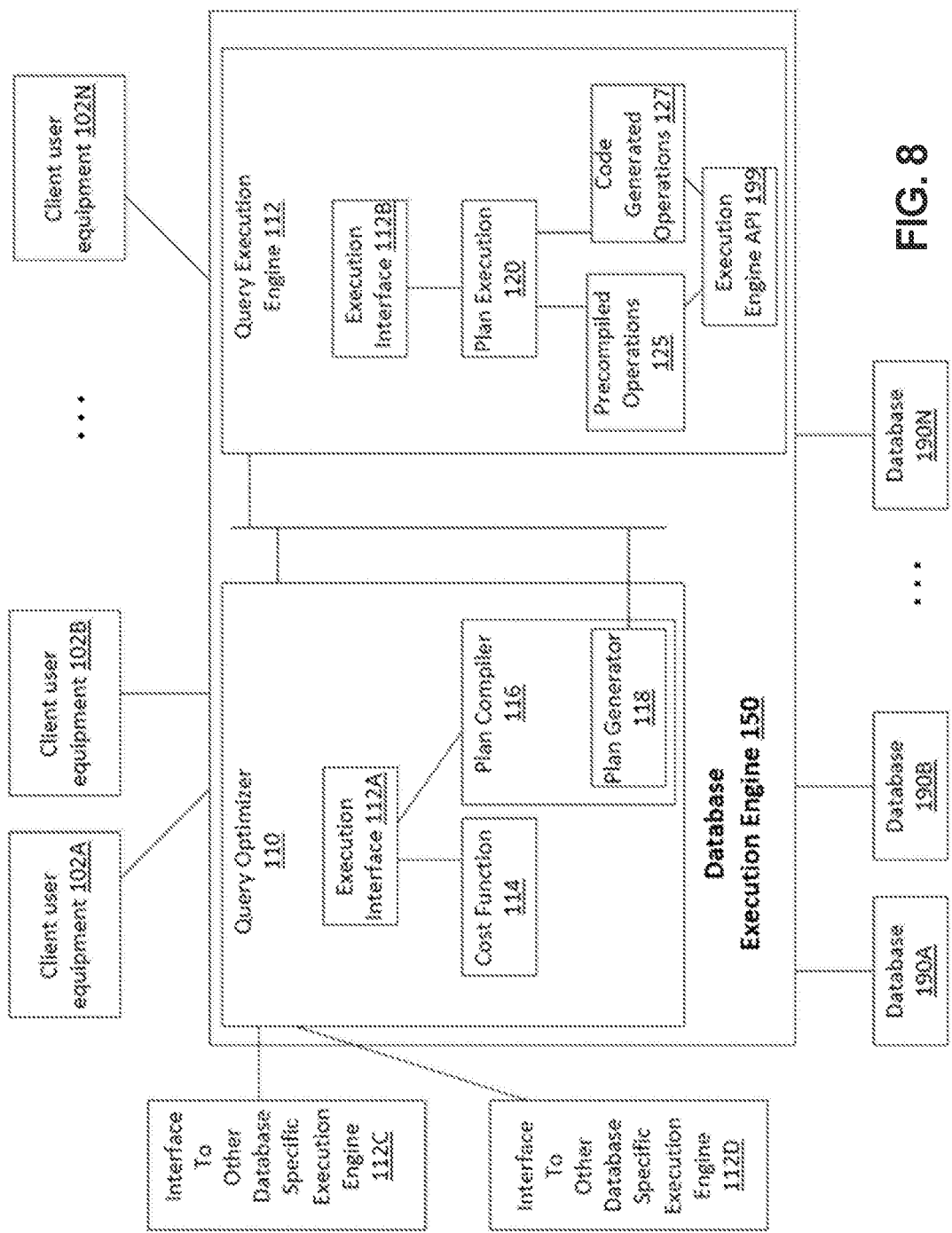
FIG. 8 depicts another block diagram for a system, in accordance with some example embodiments.

Referring to FIG. 8, the database management system 100 may include at least one table stored on a database (e.g., databases 190A-N). The database management system 100 may receive, from client equipment 102A, 102B, the query for execution. The query may include a request to join data from at least one table, such as a dimension table or input source, with data from a fact table. The at least one table, such as the dimension table or input source, may include one, two, three, four, five, or more tables. The at least one table, such as the dimension table or input source, may include a first dimension table, a second dimension table, a third dimension table, and so on. The data from the at least one table, such as the dimension table or input source, may be stored on the same or different databases, such as the databases 190A-N. The data from the fact table may be stored on a database (which may be the same as or different from the database on which the data from the at least one table, such as the dimension table or input source, is stored), such as the databases 190A-190N.

As noted above, the query may include a request to join first data from a first dimension table and second data from a second dimension table with fact data from a fact table. The data contained in the dimension tables (e.g., the first and second dimension tables) may include attributes or other information about the fact data stored in the fact table. The query may further include at least one predicate, such as one, two, three, four, or more predicates, that are used for processing the request. As used herein, a predicate of the query defines a logical condition or expression included in a query. The predicate may be an expression (e.g., a Boolean expression), a condition, a keyword that specifies a relationship between two expressions, and/or the like that is applied to rows in a table. In other words, the predicate may determine which rows of a table are relevant to a particular query, such as to the request to join the first data and the second data with the fact data. Further, as used herein, a dynamic predicate is a transformation of the predicate that includes a filter.

The query may include at least a first predicate, a second predicate, and a third predicate, among other predicates. The first predicate may include any arbitrary predicate, such as a predicate that is used for a table scan of at least one of the first dimension table, the second dimension table, and/or the fact table. The second predicate may also include any arbitrary predicate, such as a predicate that is used for a table scan of at least one of the first dimension table, the second dimension table, and/or the fact table. The third predicate may include an expression, such as a query expression, associated with the first data from the first dimension table, the second data from the second dimension table, and/or the fact data from the fact table. Additionally, and/or alternatively, the third predicate may include a reference to a column associated with the first data from the first dimension table, the second data from the second dimension table, and/or the fact data from the fact table.

An example query is included below:

| | |
|---|---|
| SELECT | * |
| FROM | |
| ( ( T | JOIN $S_1$ ON $T.col_1 = S_1.exp$) |
| | JOIN $S_2$ ON $T.col_2 = S_2.exp$) ) |
| WHERE | pred(T); |

The example query includes a join operator. The join operator here includes a request to join fact data from a fact table (e.g., Table T) with first data from a first dimension table (e.g., Table $S_1$) and second data from a second dimension table (e.g., Table $S_2$). While FIGS. 1-6 are described with respect to the example query, other queries, such as queries including join operators may be processed by the database management system 100 using the same and/or similar described methods and/or techniques. For example, other queries with join operators that include a request to join a fact table (e.g., Table T) with data from one (e.g., a Table $S_1$), two (e.g., a Table $S_2$), three (e.g., a Table $S_3$), and so on, dimension tables may be processed by the database management system 100 using the same and/or similar described methods and/or techniques.

Figure 2:
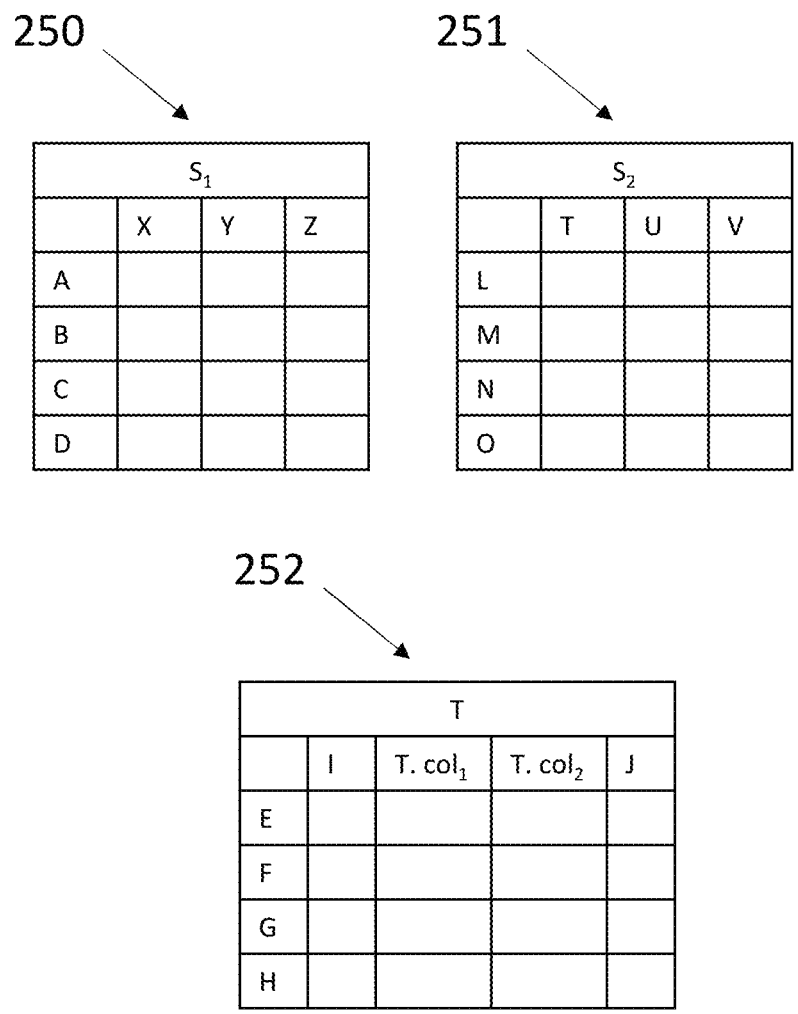
FIG. 2 depicts example tables for use in execution of a query, in accordance with some example embodiments.

As shown in FIG. 1, which depicts a logical representation 200 of the query, and with reference to the above example query, the query includes, at 204A, a request (e.g., SELECT*FROM query AS $S_1$ JOIN T), such as a first request, to join first data from a first dimension table $S_1$ (e.g., a first dimension table 250 shown in FIG. 2) with fact data from a fact table T (e.g., a fact table 252 shown in FIG. 2). The join, at 204A, may include a join operator, such as an inner join, an outer join, and/or the like. The join, at 204A, may additionally and/or alternatively be a hash join (see FIG. 4). The request to join the first data from the first dimension table $S_1$ with the fact data from the fact table T may be used in a projection at 202. The first data from the first dimension table $S_1$ and/or the fact data from the fact table T may be provided via a first sub plan $S_1$, at 206A, of the query plan used to execute the query.

Additionally and/or alternatively, the query includes, at 204B, a request (e.g., SELECT*FROM query AS $S_2$ JOIN T), such as a second request, to join second data from a second dimension table $S_2$ (e.g., a second dimension table 251 shown in FIG. 2) with fact data from the fact table T (e.g., the fact table 252). The join, at 204B, may include a join operator, such as an inner join, an outer join, and/or the like. The join, at 204B, may additionally and/or alternatively include a hash join (see FIG. 4). The request to join the second data from the second dimension table $S_2$ with the fact data from the fact table T may be used in the projection at 202. The second data from the second dimension table $S_2$ and/or the fact data from the fact table T may be provided via a second sub plan $S_2$, at 206B, of the query plan used to execute the query. Consistent with embodiments described herein, the first request and the second request may be part of the same request or a different request within the query. Additionally, in some embodiments, the query includes additional requests to join data from additional dimension tables with the fact table 252.

The example query includes a first predicate, a second predicate, and a third predicate. The first predicate may include: "ON $T.col_1=S_1.exp$." Thus, the first predicate may include an expression (e.g., $S_1.exp$) associated with the first dimension table $S_1$. The first predicate may also include a reference to a column (e.g., $T.col_1$) associated with the fact data from the fact table T. In some embodiments, the column is a join column that is used to join the first dimension table $S_1$ and the fact table T. Thus, the first predicate, which in this case is part of the ON clause, may be used to determine which rows in the first dimension table $S_1$ and/or the fact table T that are relevant to the join operation, such as at 204A.

The second predicate may include: "ON $T.col_2=S_2.exp$." Thus, the second predicate may include an expression (e.g., $S_2.exp$) associated with the second dimension table $S_2$. The second predicate may also include a reference to a column (e.g., $T.col_2$) associated with the fact data from the fact table T. In some embodiments, the column is a join column that is used to join the second dimension table $S_2$ and the fact table T. Thus, the second predicate, which in this case is part of the ON clause, may be used to determine which rows in the second dimension table $S_2$ and/or the fact table T that are relevant to the join operation, such as at 204B.

Referring again to the example query, the third predicate in this example is in the WHERE clause. For example, the third predicate includes "pred(T)," which is an arbitrary predicate, such as an expression, a condition, or the like, on the fact table T (e.g., fact table 252). The third predicate, which in this case is part of the SELECT statement's WHERE clause, may be used to determine which rows in the first dimension table $S_1$, the second dimension table $S_2$, and/or the fact table T that are relevant to execution of the query. The third predicate may be used during a table scan of the fact table T. For example, as shown in FIG. 1, the table scan at 208 may be based on at least the third predicate of the query. The table scan may be used to scan the table T for rows that are relevant to the join operation of the query, based at least on the third predicate.

Figure 3:
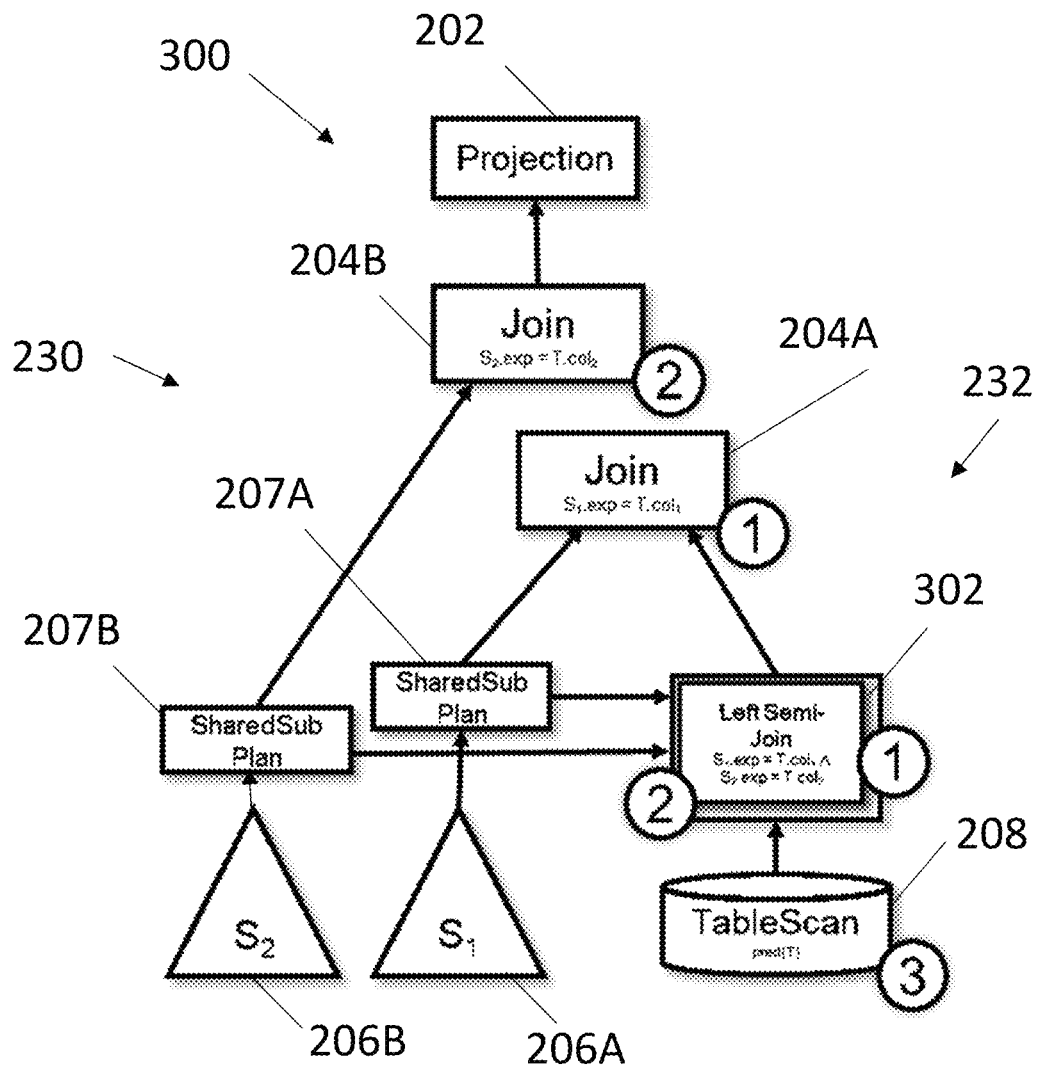
FIG. 3 depicts an example transformation of a logical representation of a query, in accordance with some example embodiments.

FIG. 3 depicts a first example transformation 300 of the logical representation 200 of the query shown in FIG. 2, in accordance with some example embodiments. The database management system 100 may employ a semi-join reduction technique using the dynamic predicate (corresponding to each input source or dimension table) consistent with embodiments of the current subject matter to maximize efficiency in processing the query, such as the example query including a join, such as at 204A and/or 204B. To implement the semi-join reduction technique consistent with embodiments of the current subject matter, the logical representation 200 has been transformed to include a semi-join at 302, a first shared sub plan at 207A, and a second shared sub plan at 207B. The inclusion of the semi-join at 302 allows for the semi-join reduction to be implemented by the database management system 100.

The first shared sub plan at 207A is an extension of the sub plan at 206A and is a view in front of the first sub plan that includes semantics for all data flowing from the first sub plan at 206A into a build side 230 and/or a probe side 232 of the query plan. The second shared sub plan at 207B may also be an extension of the second sub plan at 206B and is a view in front of the second sub plan that includes semantics for all data flowing from the second sub plan at 206B into the build side 230 and/or the probe side 232 of the query plan. On the build side 230, one or more hash tables may be used as auxiliary structures to facilitate matching of rows between the first dimension table $S_1$ and the fact table T and between the second dimension table $S_2$ and the fact table T on the probe side 232. Because the probe side 232 is more computationally expensive than the build side 230, the database management system 100 applies the semi-join reduction consistent with embodiments of the current subject matter to filter and/or reduce the number of rows that are scanned as part of the processing of the query.

Referring to FIG. 3, the semi-join at 302 may include a left semi-join, a right semi-join, and/or the like. The semi-join may be based on the first predicate and/or the second predicate. For example, as described herein with respect to the join at 204A, the first predicate may include a first expression (e.g., $S_1.exp$) associated with the first dimension table $S_1$. The first predicate may also include a reference to a first column (e.g., $T.col_1$) associated with the fact data from the fact table T. In some embodiments, the first column is a join column that is used in the semi-join at 302. Thus, the first predicate, which in this case is part of the ON clause, may be used to determine which rows in the first dimension table $S_1$ and/or the fact table T that are relevant to the semi-join operation, such as at 302.

Similarly, as described herein with respect to the join at 204B, the second predicate may include a second expression (e.g., $S_2.exp$) associated with the second dimension table $S_2$. The second predicate may also include a reference to a second column (e.g., $T.col_2$) associated with the fact data from the fact table T. In some embodiments, the second column is a join column that is used in the semi-join at 302. Thus, the second predicate, which in this case is part of the ON clause, may be used to determine which rows in the second dimension table $S_2$ and/or the fact table T that are relevant to the semi-join operation, such as at 302.

Figure 4:
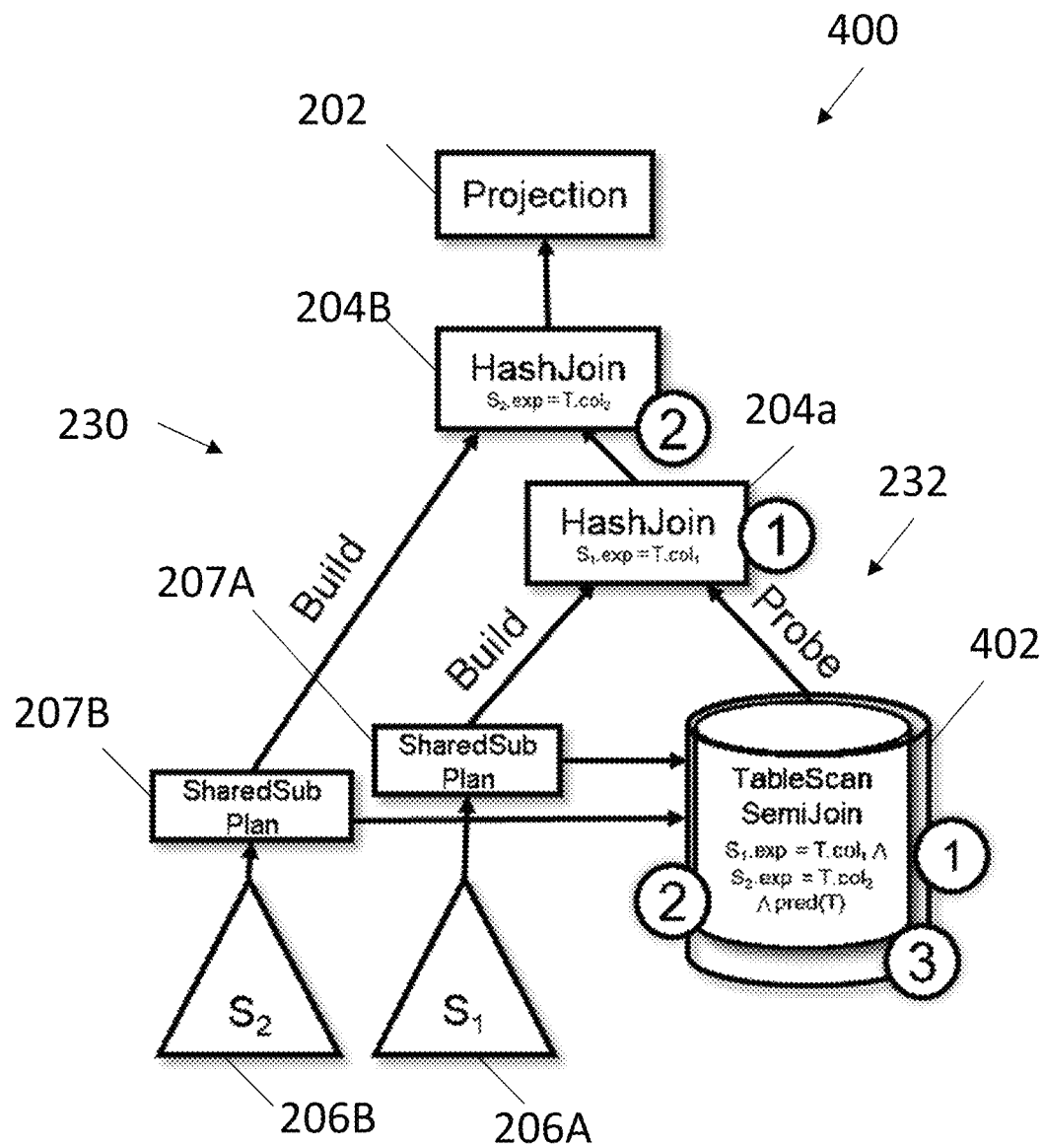
FIG. 4 depicts an example transformation of a logical representation of a query, in accordance with some example embodiments.

FIG. 4 depicts a second example transformation 400 of the logical representation 200 of the query shown in FIG. 1.

The second example transformation 400 is a further transformation of the logical representation 200, based on the first example transformation 300, in accordance with some example embodiments. As shown in FIG. 4, the table scan at 208 and the semi-join at 302 have been combined into a table scan semi-join operator at 402. To generate the combined table scan semi-join operator at 402, the first predicate (e.g., $S_1.exp=T.col_1$) and the second predicate (e.g., $S_2.exp=T.col_2$) may each be transformed into a dynamic predicate (e.g., table scan predicate with integrated semi-join filter) for execution of the query, as described in more detail below. In other words, the first predicate may be transformed into a first dynamic predicate and the second predicate may be transformed into a second dynamic predicate, and so on.

Figure 5:
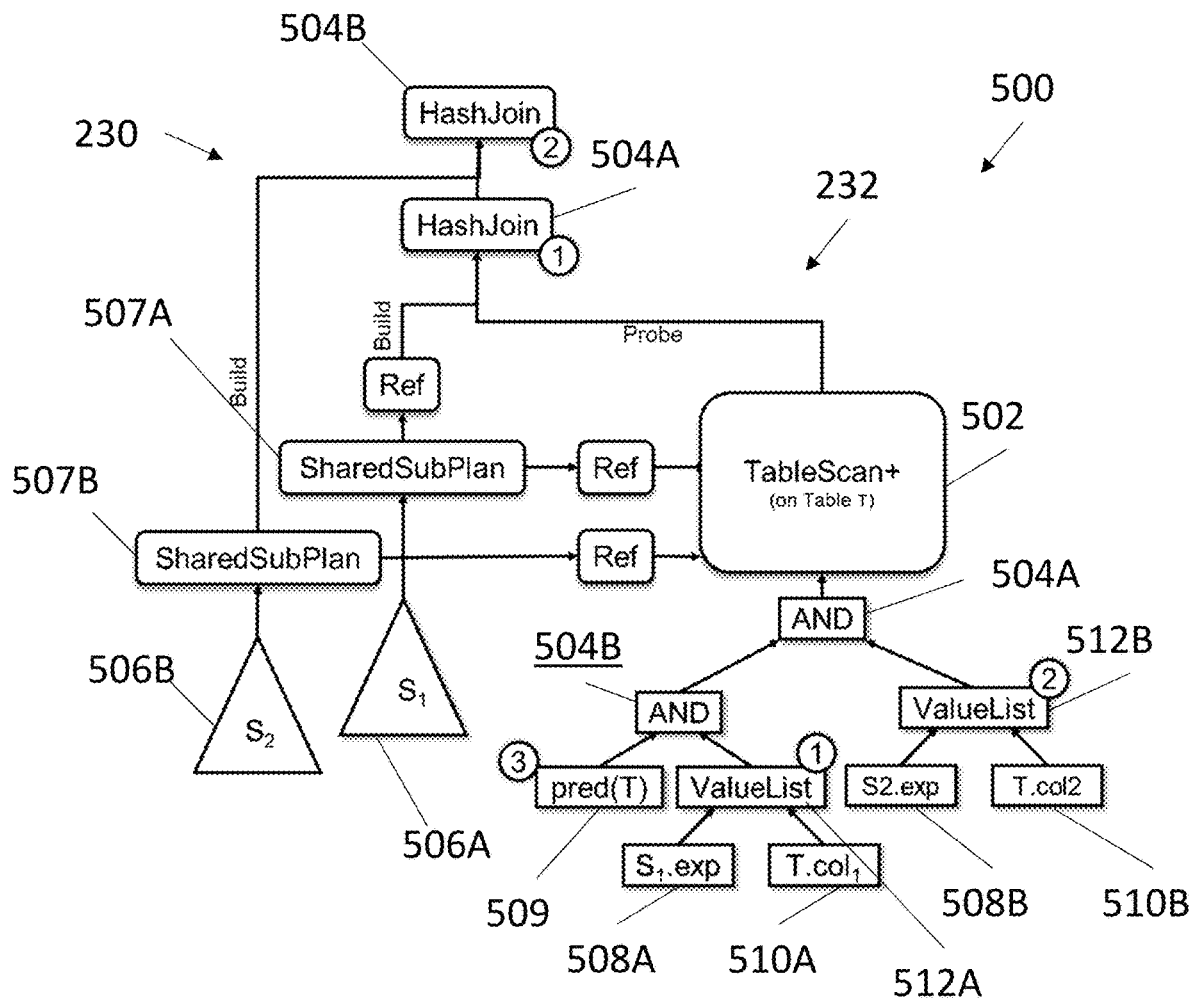
FIG. 5 depicts an example transformed algebraic representation of a query including a dynamic predicate, in accordance with some example embodiments.

FIG. 5 depicts an example transformed algebraic representation 500 of the query, further illustrating the transformation of the first predicate into the first dynamic predicate and the second predicate into the second dynamic predicate, in accordance with some example embodiments. The algebraic representation 500 corresponds to the example transformation 400. For example, a first sub plan at 506A, a first shared sub plan at 507A, a first hash join at 504, a second sub plan at 506B, a second shared sub plan at 507B, and a second hash join at 504B correspond to the first sub plan at 206A, the first shared sub plan at 207A, the first hash join at 204A, the second sub plan 206B, the second shared sub plan 207B, and the second hash join at 204B, respectively. In other words, the first sub plan at 506A, the first shared sub plan at 507A, the hash join at 504A, the second sub plan 506B, the second shared sub plan 507B, and the second hash join at 504B are algebraic representations of the first sub plan at 206A, the first shared sub plan at 207A, the first hash join at 204A, the second sub plan 206B, the second shared sub plan 207B, and the second hash join at 204B, respectively. As such, the first sub plan at 506A, the first shared sub plan at 507A, the hash join at 504A, the second sub plan 506B, the second shared sub plan 507B, and the second hash join at 504B have the same properties and/or components as the first sub plan at 206A, the first shared sub plan at 207A, the first hash join at 204A, the second sub plan 206B, the second shared sub plan 207B, and the second hash join at 204B, respectively.

Referring to FIG. 5, the table scan semi-join at 402 (in FIG. 4) is algebraically represented by the table scan+(e.g., TableScan+) at 502. As further shown in FIG. 5, the first predicate of the query has been transformed into the first dynamic predicate at 512A and the second predicate of the query has been transformed into the second dynamic predicate at 512B. For example, the first predicate has been converted to a first child node (at 512A) of the table scan at 502 and the second predicate has been converted to a second child node (at 512B) of the table scan at 502. The third predicate (e.g., pred(T)) of the query has also been converted to a child node at 509 in conjunction with the first dynamic predicate. For example, as shown, the third predicate at 509 and the first dynamic predicate at 512A may be child nodes of the table scan at 502 and may be combined using a conjunction at 504B by, for example, using an AND clause. Further, The second dynamic predicate at 512B is shown as a child node of the table scan at 502 that may be combined with the child node corresponding to the third predicate at 509 and the child node corresponding to the first dynamic predicate at 512A using a conjunction at 504A by, for example, using an AND clause. While the first dynamic predicate is shown as being combined with the third predicate using a conjunction at 504B prior to being combined with the second dynamic predicate using a conjunction at 504A, the third predicate can alternatively be converted to the child node at 509 in conjunction at 504B with the second dynamic predicate at 512B prior to being combined with the first dynamic predicate at 512A using the conjunction at 504A. In some embodiments, the query optimizer 110 determines the order of the conjunctions and/or whether the third predicate is combined with the first and/or second dynamic predicates, to improve query execution efficiency depending on the scenario.

Again referring to FIG. 5, the first dynamic predicate at 512A is shown as a first value list (e.g., ValueList) operator and the second dynamic predicate at 512B is shown as a second value list (e.g., ValueList) operator. The first and second value list operators each return a list of all the values, for a given column within the query, delimited by the given value.

Using the example query provided above, the first value list operator at 512A may be written as: ValueList ($S_1$.exp, $T.col_1$). The database management system 100 may execute the first value list operator at 512A to collect all values from expression $S_1$.exp at 508A and filter $T.col_1$ at 510A based on the values. Further, the second value list operator at 512B may be written as: ValueList ($S_2$.exp, $T.col_2$). The database management system 100 may execute the second value list operator at 512B to collect all values from expression $S_2$.exp at 508B and filter $T.col_2$ at 510B based on the values. While $T.col_1$ denotes a first column from the fact table T and $T.col_2$ denotes a second column from the fact table T, where the table scan at 502 is performed, $S_1$.exp and $S_2$.exp may, in some embodiments, be arbitrary expressions. In this way, the first value list operator at 512A and the second value list operator at 512B may resemble IN-List predicates, which may include T.b IN (e1, e2, . . . , en), where e1, e2, . . . , en are not known at compile time but gathered at query execution time.

In some implementations, the first data from the first dimension table, the second data from the second dimension table, and the fact data from the fact table may be represented by at least one vector of data. For example, data of the first data from the first dimension table, the second data from the second dimension table, and/or the fact data from the fact table may be stored in a row of a corresponding one of the first dimension table, the second dimension table, or the fact table as a vector of data. The vector of data may include a plurality of values, such as numerical and/or integer values. For example, every column of the first dimension table, the second dimension table, and/or the fact table may be represented as a data vector of length "table size". Each row of the first dimension table, the second dimension table, and/or the fact table is a tuple including one entry from the data vector of each column. The tuple may include and/or represent the vector of data. As an example, to find the value for a certain column of row #100, the data vector of that certain column is searched at position 100 within the column. Thus, each row of the first dimension table, the second dimension table, and/or the fact table may include a tuple (or a vector of data) representing at least some of the first data, the second data, and/or the fact data, respectively, that is an entry from the data vector of at least one column in the respective one of the first dimension table, the second dimension table, and/or the fact table.

The at least one vector of data may correspond to a value identifier (also referred to herein as valueIds or VIDs). For example, in a database (e.g., the databases 190A-N), such as a column-store database or a column-oriented database, and/or one or more tables stored on the database, such as the first dimension table $S_1$ (e.g., the first dimension table 250), the second dimension table $S_2$ (e.g., the second dimension table 251), and/or the fact table T (e.g., the fact table 252), the data values represented by vectors of data in the columns of a table may be compressed using a dictionary or dictionary encoding. Generally, the dictionaries include columns that store the actual data. The columns of the first dimension table $S_1$, the second dimension table $S_2$, and/or the fact table T may be represented as a data vector, which may store index values that reference the dictionaries. These index values may be the value identifiers, which may include numeric values and/or identifiers that include a numeric value, that map onto the data vectors so it is not necessary to search the first data, the second data, and/or the fact data itself, which would be cumbersome and computationally expensive. Instead, a column of the dictionary may be a list of index values (e.g., the value identifiers). Each value identifier in the column represents a position in the dictionary. For example, a value identifier with a value of "5" points to a sixth value in the corresponding dictionary, since the value identifiers begin with the value "0" pointing to a first value in the corresponding dictionary. The database management system 100 may maintain a mapping, such as via the dictionary, between the vectors of data representing the first data, the second data, and/or the fact data, and value identifiers that correspond to each of the vectors of data.

Figure 6:
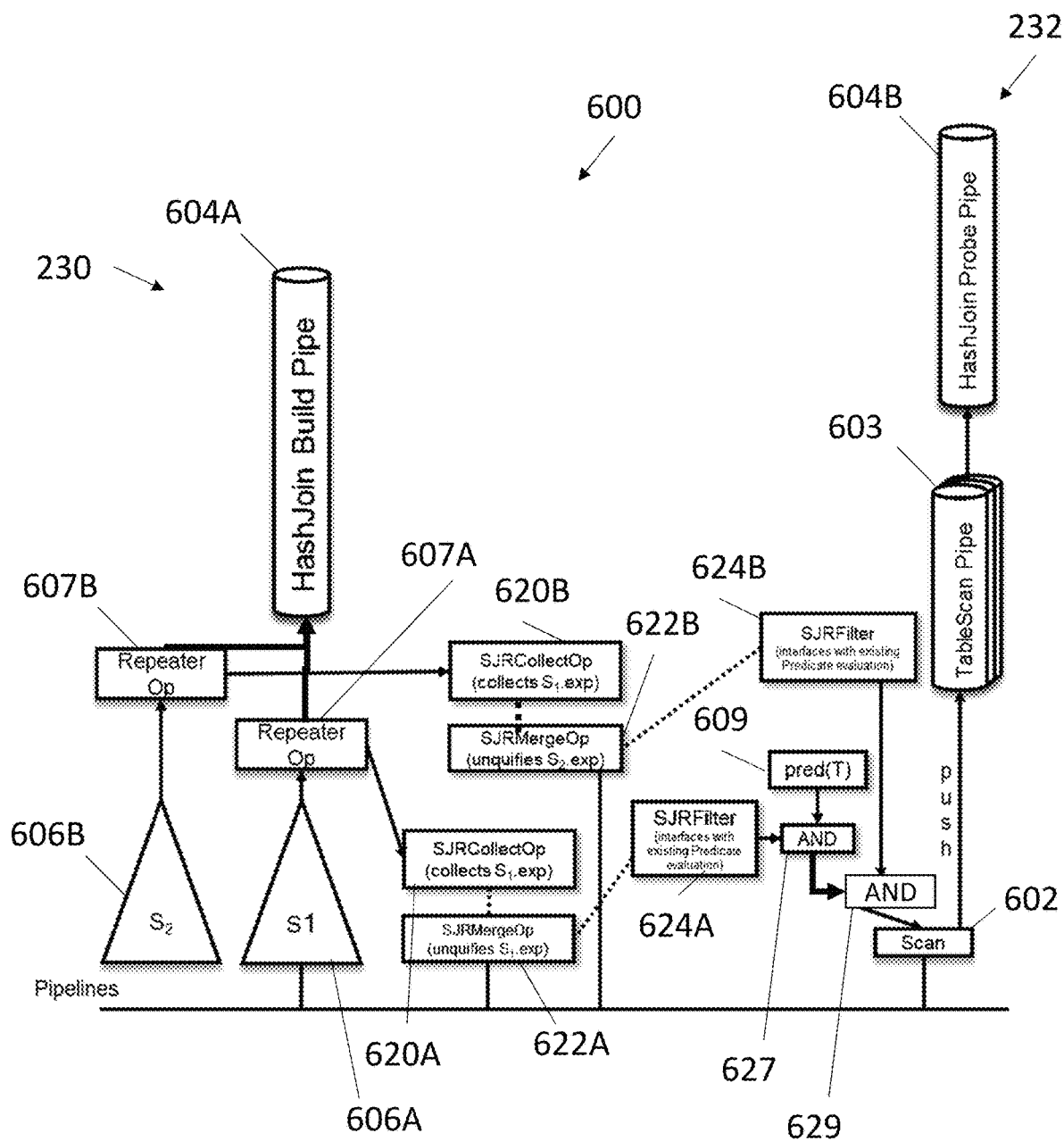
FIG. 6 depicts an example transformed algebraic representation of a query including a dynamic predicate, in accordance with some example embodiments.

FIG. 6 depicts an example transformed algebraic representation 600 of the query that has been further expanded, in accordance with some example embodiments. For example, FIG. 6 shows an example pipeline architecture of the database management system 100, such as inside the execution engine 150.

Referring to FIG. 6, the representation 600 includes a first sub plan S1 at 606A and a first repeater operator (e.g., RepeaterOp) at 607A that correspond to the first sub plan at 506A and the first shared sub plan at 507A, respectively. The repeater operator at 607A receives data from the first sub plan at 606A. From the first repeater operator at 607A, data (e.g., the first data) flows to the build side 230 and towards the probe side 232. At the build side 230, the data flows from the first repeater operator at 607A to the hash join build pipeline at 604A where the data is used for building the hash tables for the hash join.

Similarly, the representation 600 includes a second sub plan S2 at 606B and a second repeater operator (e.g., RepeaterOp) at 607B that correspond to the second sub plan at 506B and the second shared sub plan at 507B, respectively. The second repeater operator at 607B receives data from the second sub plan at 606B. From the second repeater operator at 607B, data (e.g., the second data) flows to the build side 230 and/or towards the probe side 232. At the build side 230, the second data flows from the second repeater operator at 607B to the hash join build pipeline at 604B where the second data is used for building the hash tables for the hash join.

FIG. 6 illustrates an expansion of the first dynamic predicate (e.g., the value list operator at 512A) and the second dynamic predicate (e.g., the value list operator at 512B). Each dynamic predicate may include a collection operator, a merge operator, and/or a filter operator.

The collection operator collects the data flowing from the repeater operator towards the probe side 232. The collection operator parallelizes the collected data for further processing. For example, the collection operator may parallelize the data to improve processing speeds and efficiency. Parallelizing the data may allow for parallel processing of the data, which increases the processing speeds.

The merge operator may receive the parallelized data from the collection operator. The merge operator may merge the parallelized data. Merging the parallelized data allows for the parallelized data to be further processed before it is filtered. The merged data may be stored in a temporary store. The merge operator may additionally and/or alternatively uniquify the merged data, which allows for faster filtering of the data. The merged data may be uniquified by removing duplicate values from each vector of data representing the data (e.g., the first data and/or the second data from the first dimension table and/or the second dimension table, respectively). For example, a vector of data may include: <1 1 2 2 4>. After uniquifying the vector of data, the vector of data may include: <1 2 4>. Thus, the duplicate values from each vector of data may be removed. While the term uniquify is used herein, uniquifying the data may also be referred to herein as duplicate elimination or eliminating duplicates in the vector of data.

In some embodiments, the vectors of data may be mapped to value identifiers, as described herein. For example, as described herein, the database management system 100 may maintain a mapping between the vectors of data representing the first data, the second data, and/or the fact data, and a corresponding value identifier stored in a data vector (e.g., a list of the value identifiers). Each value identifier may indicate a position (e.g., a row) in a dictionary in which the corresponding vectors of data is stored. In some embodiments, the merge operator back maps the value identifiers to the corresponding vectors of data.

The filter operator can perform a data vector scan and/or an index scan. The filter operator of the dynamic predicate filters at least the column (e.g., the column specified by the query) associated with the fact data from the fact table T based on a value identifier mapped to at least one vector of data representing the merged data. The column may be filtered by removing, from the fact table T, at least one row that does not correspond to the value identifier based on which the filtering is performed. Thus, at least one row may be removed from the fact table T without reading all of the data represented by each vector of data stored in the corresponding dimension table. Rather, the filter operator may search only the value identifiers associated with each vector of data. In other words, the filter operator may request, from the data store containing at least the fact table T all rows containing data corresponding to at least one value identifier. This allows for dangling tuples to be quickly and efficiently removed from the fact table T, which in turn reduces the number of rows from the fact table T that are considered by the database management system 100 during execution of the query. Configurations of the database management system 100 described herein reduce processing speeds and improves processing efficiency for queries, such as queries including a join operator.

In some embodiments, the query may include multiple predicates that may be transformed to a dynamic predicate. In such embodiments, the dynamic predicate may include a plurality of value list operators corresponding to each value identified in the query. In this example, the expression S.exp may refer to multiple columns from a single source table. This may allow for efficient operations in data warehouse scenarios, where data is organized in star-schema, snowflake-schema, and/or the like. As described herein, a dynamic predicate may be created (e.g., based on the predicates included in the query) for each of the input source tables (e.g., the dimension tables) referenced by the query. This allows for multiple input source relations to be leveraged, further improving efficiency in query processing.

Referring to FIG. 6, the first dynamic predicate may include a first collection operator (e.g., SJRCollectOp) at 620A, a first merge operator (e.g., SJRMergeOp) at 622A, and/or a first filter operator (e.g., SJRFilter) at 624A. For example, the first collection operator at 620A collects at least the first data from the first dimension table $S_1$ based at least on the first expression (e.g., $S_1$.exp) included in the query, such as in the first predicate of the query. The first collection operator at 620A may parallelize the first data for further processing. The first merge operator at 622A may receive the parallelized first data from the first collection operator at 620 and merge the parallelized first data. The first merge operator at 622A may additionally and/or alternatively uniquify the merged first data, which allows for faster filtering of the data. The first filter operator at 624A filters at least the first column (e.g., $T.col_1$ from the first predicate of the query) associated with the fact data from the fact table T based on a value identifier mapped to at least one vector of data representing the merged first data.

Again referring to FIG. 6, the second dynamic predicate may include a second collection operator (e.g., SJRCollectOp) at 620B, a second merge operator (e.g., SJRMergeOp) at 622B, and/or a second filter operator (e.g., SJRFilter) at 624B. For example, the second collection operator at 620B collects at least the second data from the second dimension table $S_2$ based at least on the second expression (e.g., $S_2$.exp) included in the query, such as in the second predicate of the query. The second collection operator at 620B may parallelize the second data for further processing. The second merge operator at 622B may receive the parallelized second data from the second collection operator at 620 and merge the parallelized second data. The second merge operator at 622B may additionally and/or alternatively uniquify the merged second data, which allows for faster filtering of the data. The second filter operator at 624B further filters at least the second column (e.g., $T.col_2$ from the second predicate of the query) associated with the fact data from the fact table T based on a value identifier mapped to at least one vector of data representing the merged second data.

Again referring to FIG. 6, the database management system 100 (e.g., via the execution engine 150) may execute the query by at least scanning the fact table T (and/or the first dimension table $S_1$, and/or the second dimension table $S_2$) based on the third predicate (e.g., pred(T)) and the filtered columns. For example, the execution engine 150 may scan at 602, using a table scan, the fact table T based at least on a first conjunction (e.g., AND) at 627 of the filtered first column from the first filter operator at 624A and the third predicate at 609, and a second conjunction (e.g., AND) at 629 of the filtered second column from the second filter operator at 624B. Thus, the first and second dynamic predicates are implemented as part of an efficient semi-join reduction that reduces a number of rows in at least the fact table T, based on multiple input source tables, for use in scanning of the fact table T. The scan may be pushed to a table scan pipeline (e.g., TableScan Pipe) at 603, and to the hash join probe side pipeline (e.g., HashJoin Probe Pipe) at 604B for use in the hash join.

FIG. 7 depicts a flowchart illustrating a process 700 for processing queries using a table scan predicate with integrated semi-join filter, in accordance with some example embodiments. Further, the process 700 may be used for processing queries using a table scan predicate with integrated semi-join filter in scenarios in which multiple input sources (e.g., relational input sources, such as dimension tables) are joined with a fact table. Referring to FIGS. 1-6, one or more aspects of the process 700 may be performed by the execution engine 150, and/or another component of the database management system 100. As described herein, the database management system 100 helps to efficiently execute a query, such as when the query includes a request to join data from multiple input sources (e.g., relational input sources, such as dimension tables) with another table (e.g., a fact table), and/or a semi-join reduction leveraging multiple input sources is desired.

At 702, the database management system 100 (e.g., the execution engine 150) may receive a query. The query may include a request to join first data from a first dimension table and second data from a second dimension table with fact data from a fact table. For example, the query may include a join operator.

The query may additionally and/or alternatively include a first predicate, a second predicate, and a third predicate. The first predicate may include a first expression (e.g., a query expression) associated with the first data from the first dimension table and/or a first reference to a first column associated with the fact data from the fact table. The second predicate may include a second expression (e.g., a query expression) associated with the second data from the second dimension table and/or a second reference to a second column associated with the fact data from the fact table. The third predicate may be used for a table scan of the fact table. The table scan may be used to scan the fact table.

At 704, the database management system 100 (e.g., the execution engine 150) may apply a first dynamic predicate to at least the first data. The first dynamic predicate may be based on values that are not available at the time the query is received, but may be available at the time of query execution. The first dynamic predicate may be associated with the first dimension table. The first dynamic predicate may include a transformation of the first predicate for execution of the query. For example, the database management system 100 (e.g., the execution engine 150) may transform the first predicate into the first dynamic predicate for execution of the query. The first predicate may be transformed to the first dynamic predicate by converting the first predicate to a first child node of the table scan, which as described herein scans the fact table. In some embodiments, the third predicate may also be included as another child node of the table scan. The first predicate and the third predicate may be combined using a conjunction (e.g., an AND conjunction) for use during the table scan.

In some embodiments, the first dynamic predicate may be applied to at least the first data referenced by the first expression included in the query, such as in the first predicate of the query. The first dynamic predicate may be applied to at least the first data by at least collecting the first data based on the first expression. For example, the first data, such as the portion of the first data relevant to the first expression, may be collected. The collected first data may be parallelized to improve data processing speed.

Additionally and/or alternatively, the execution engine 150 may apply the first dynamic predicate by at least merging the first data. The first data may be merged after collecting the first data. The first data may be merged by at least uniquifying the first data. For example, the first data may be uniquified by removing duplicate values from at least one vector of data representing the first data. This allows for the at least one vector of data to include unique values that are easier to process.

Additionally and/or alternatively, the execution engine 150 may apply the first dynamic predicate by filtering the first column associated with the first data from the fact table. The execution engine 150 may filter the first column based on a first value identifier mapped to the at least one vector of data representing the merged first data. For example, the execution engine 150 may remove at least one row from the fact table that does not correspond to the desired first value identifier. This allows for dangling tuples to be quickly and efficiently removed.

At 706, the database management system 100 (e.g., the execution engine 150) may apply a second dynamic predicate to at least the second data. The second dynamic predicate may be based on values that are not available at the time the query is received, but may be available at the time of query execution. The second dynamic predicate may be associated with the second dimension table. The second dynamic predicate may include a transformation of the second predicate for execution of the query. For example, the database management system 100 (e.g., the execution engine 150) may transform the second predicate into the second dynamic predicate for execution of the query. The second predicate may be transformed to the second dynamic predicate by converting the second predicate to a second child node of the table scan, which as described herein scans the fact table. In some embodiments, the third predicate may also be included as another child node of the table scan. The second predicate, the first predicate, and the third predicate may be combined using a conjunction (e.g., an AND conjunction) for use during the table scan.

In some embodiments, the second dynamic predicate may be applied to at least the second data referenced by the second expression included in the query, such as in the second predicate of the query. The second dynamic predicate may be applied to at least the second data by at least collecting the second data based on the second expression. For example, the second data, such as the portion of the second data relevant to the second expression, may be collected. The collected second data may be parallelized to improve data processing speed.

Additionally and/or alternatively, the execution engine 150 may apply the second dynamic predicate by at least merging the second data. The second data may be merged after collecting the second data. The second data may be merged by at least uniquifying the second data. For example, the second data may be uniquified by removing duplicate values from at least one vector of data representing the second data. This allows for the at least one vector of data to include unique values that are easier to process.

Additionally and/or alternatively, the execution engine 150 may apply the second dynamic predicate by filtering the second column associated with the second data from the fact table. The execution engine 150 may filter the second column based on a second value identifier mapped to the at least one vector of data representing the merged second data. For example, the execution engine 150 may remove at least one row from the fact table that does not correspond to the desired second value identifier. This allows for dangling tuples to be quickly and efficiently removed.

At 708, the database management system 100 (e.g., the execution engine 150) may execute the query by at least scanning the fact table based on the first predicate, the second predicate, the first filtered column, and the second filtered column. The first dynamic predicate and the second dynamic predicate may be together leveraged and implemented as a semi-join reduction to reduce a number of rows in at least the fact table for use in the scanning of the fact table.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory result in operations comprising: receiving a query including a request to join first data from a first dimension table and second data from a second dimension table with fact data from a fact table, the query further including: a first predicate including a first expression associated with the first data and a first reference to a first column associated with the fact data from the fact table, a second predicate including a second expression associated with the second data and a second reference to a second column associated with the fact data from the fact table, and a third predicate for use in a table scan of the fact table; applying a first dynamic predicate associated with the first dimension table to at least the first data by at least collecting the first data based on the first expression and filtering the first column based on a first value identifier mapped to at least one vector of data representing the collected first data, the first dynamic predicate including a transformation of the first predicate for execution of the query; applying a second dynamic predicate associated with the second dimension table to at least the second data by at least collecting the second data based on the second expression and filtering the second column based on a second value identifier mapped to at least one vector of data representing the collected second data, the second dynamic predicate including a transformation of the second predicate for execution of the query; and executing the query by at least scanning the fact table based on the first predicate, the second predicate, the first filtered column, and the second filtered column.

Example 2: The system of Example 1, wherein the operations further comprise: transforming the first predicate into the first dynamic predicate by at least converting the first predicate to a first child node of the table scan; transforming the second predicate into the second dynamic predicate by at least converting the second predicate to a second child node of the table scan, and wherein the table scan is configured to perform the scanning of the fact table.

Example 3: The system of any one of Examples 1 to 2, wherein the transforming further comprises: including the first predicate as a child node of the table scan in conjunction with the first dynamic predicate; and including the second predicate as another child node of the table scan in conjunction with the second dynamic predicate.

Example 4: The system of any one of Examples 1 to 3, wherein collecting the first data comprises parallelizing the first data; wherein the applying the first dynamic predicate further comprises merging, after collecting the first data, the first data, wherein collecting the second data comprises parallelizing the second data; wherein the applying the second dynamic predicate further comprises merging, after collecting the second data, the second data.

Example 5: The system of any one of Examples 1 to 4, wherein the merging the first data comprises uniquifying the first data, and wherein the merging the second data comprises uniquifying the second data.

Example 6: The system of any one of Examples 1 to 5, wherein the uniquifying the first data comprises removing duplicate values from the at least one vector of data representing the collected first data, and wherein the uniquifying the second data comprises removing duplicate values from the at least one vector of data representing the collected second data.

Example 7: The system of any one of Examples 1 to 6, wherein the filtering the first column comprises removing, from the fact table, at least one row that does not correspond to the first value identifier, and wherein the filtering the second column comprises removing, from the fact table, at least one row that does not correspond to the second value identifier.

Example 8: The system of any one of Examples 1 to 7, wherein the first dynamic predicate and the second dynamic predicate are implemented as a semi-join reduction to reduce a number of rows in at least the fact table for use in the scanning of the fact table.

Example 9: A computer-implemented method comprising: receiving a query including a request to join first data from a first dimension table and second data from a second dimension table with fact data from a fact table, the query further including: a first predicate including a first expression associated with the first data and a first reference to a first column associated with the fact data from the fact table, a second predicate including a second expression associated with the second data and a second reference to a second column associated with the fact data from the fact table, and a third predicate for use in a table scan of the fact table; applying a first dynamic predicate associated with the first dimension table to at least the first data by at least collecting the first data based on the first expression and filtering the first column based on a first value identifier mapped to at least one vector of data representing the collected first data, the first dynamic predicate including a transformation of the first predicate for execution of the query; applying a second dynamic predicate associated with the second dimension table to at least the second data by at least collecting the second data based on the second expression and filtering the second column based on a second value identifier mapped to at least one vector of data representing the collected second data, the second dynamic predicate including a transformation of the second predicate for execution of the query; and executing the query by at least scanning the fact table based on the first predicate, the second predicate, the first filtered column, and the second filtered column.

Example 10: The method of Example 9, wherein the method further comprises: transforming the first predicate into the first dynamic predicate by at least converting the first predicate to a first child node of the table scan; transforming the second predicate into the second dynamic predicate by at least converting the second predicate to a second child node of the table scan, and wherein the table scan is configured to perform the scanning of the fact table.

Example 11: The method of any one of Examples 9 to 10, wherein the transforming further comprises: including the first predicate as a child node of the table scan in conjunction with the first dynamic predicate; and including the second predicate as another child node of the table scan in conjunction with the second dynamic predicate.

Example 12: The method of any one of Examples 9 to 11, wherein collecting the first data comprises parallelizing the first data; wherein the applying the first dynamic predicate further comprises merging, after collecting the first data, the first data, wherein collecting the second data comprises parallelizing the second data; wherein the applying the second dynamic predicate further comprises merging, after collecting the second data, the second data.

Example 13: The method of any one of Examples 9 to 12, wherein the merging the first data comprises uniquifying the first data, and wherein the merging the second data comprises uniquifying the second data.

Example 14: The method of any one of Examples 9 to 13, wherein the uniquifying the first data comprises removing duplicate values from the at least one vector of data representing the collected first data, and wherein the uniquifying the second data comprises removing duplicate values from the at least one vector of data representing the collected second data.

Example 15: The method of any one of Examples 9 to 14, wherein the filtering the first column comprises removing, from the fact table, at least one row that does not correspond to the first value identifier, and wherein the filtering the second column comprises removing, from the fact table, at least one row that does not correspond to the second value identifier.

Example 16: The method of any one of Examples 9 to 15, wherein the first dynamic predicate and the second dynamic predicate are implemented as a semi-join reduction to reduce a number of rows in at least the fact table for use in the scanning of the fact table.

Example 17: A non-transitory computer-readable medium storing instructions, which when executed by at least one data processor, result in operations comprising: receiving a query including a request to join first data from a first dimension table and second data from a second dimension table with fact data from a fact table, the query further including: a first predicate including a first expression associated with the first data and a first reference to a first column associated with the fact data from the fact table, a second predicate including a second expression associated with the second data and a second reference to a second column associated with the fact data from the fact table, and a third predicate for use in a table scan of the fact table; applying a first dynamic predicate associated with the first dimension table to at least the first data by at least collecting the first data based on the first expression and filtering the first column based on a first value identifier mapped to at least one vector of data representing the collected first data, the first dynamic predicate including a transformation of the first predicate for execution of the query; applying a second dynamic predicate associated with the second dimension table to at least the second data by at least collecting the second data based on the second expression and filtering the second column based on a second value identifier mapped to at least one vector of data representing the collected second data, the second dynamic predicate including a transformation of the second predicate for execution of the query; and executing the query by at least scanning the fact table based on the first predicate, the second predicate, the first filtered column, and the second filtered column.

Example 18: The non-transitory computer-readable medium of any one of Examples 17 to 18, wherein the operations further comprise: transforming the first predicate into the first dynamic predicate by at least converting the first predicate to a first child node of the table scan; transforming the second predicate into the second dynamic predicate by at least converting the second predicate to a second child node of the table scan, and wherein the table scan is configured to perform the scanning of the fact table.

Example 19: The non-transitory computer-readable medium of any one of Examples 17 to 18, wherein the transforming further comprises: including the first predicate as a child node of the table scan in conjunction with the first dynamic predicate; and including the second predicate as another child node of the table scan in conjunction with the second dynamic predicate.

Example 20: The non-transitory computer-readable medium of any one of Examples 17 to 19, wherein collecting the first data comprises parallelizing the first data; wherein the applying the first dynamic predicate further comprises merging, after collecting the first data, the first data, wherein collecting the second data comprises parallelizing the second data; wherein the applying the second dynamic predicate further comprises merging, after collecting the second data, the second data.

FIG. 8 depicts an example of a database management system 100, in accordance with some example implementations.

The database management system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 8, the databases 190A-N represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the query execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-N. Specifically, the TableScan operator at Table 1 would result in a call for a dictionary look up for a column "X" for the value ID of "1" and an indexvector scan with a valueid obtained from the dictionary look up, which results in a document ID list that identifies one or more rows in the table 1. Then for each document ID, a call is made via execution engine 199 to look up the value IDs for columns A and B. The value IDs may be used to look up dictionary values to materialize, the columns A and B including the actual data values for those columns.

TABLE 1

| Operator | Calls made on Database API |
| --- | --- |
| 1) TableScan (Filter X = 1) | dictionary lookup column "X" for the value of ID of "1" indexvector scan with a valueid from the lookup, which results in a document ID (docid) list that identifies one or more rows in table "1" |

TABLE 1-continued

| Operator | Calls made on Database API |
| --- | --- |
| 2) Materialization (Columns A, B) | For each docid, lookup value IDs (valueids) for columns A + B For the valueids, lookup dictionary value in dictionaries of A and B |

In some implementations, the query execution engine 112 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 112 may perform execution related to handling the differences between these two types of databases. This may enable a reduction in processing at the database layer 190A-N. Moreover, the query execution engine 112 may perform other operations including rule-based operations, such as joins and projections, as well as filtering, group by, multidimensional analysis, and/or the like to reduce the processing burden on the database layer. In this way, the query execution engine 112 may execute these and other complex operations, while the database's persistence/storage layer 190A-N can perform simpler operations to reduce the processing burden at the database's persistence/storage layer 190A-N.

In some example embodiments, the query execution engine 112 may run, as noted above, just-in-time code 127 generated for some query operations, while pre-compiled code 125 may be run for other operations. Moreover, the query execution engine 112 may combine the generated code 127 with pre-compiled code 125 to further optimize execution of query related operations. In addition, the query execution engine 112 may provide for a plan execution framework that is able to handle data chunk(s), pipelining, and state management during query execution. Furthermore, the query execution engine 112 may provide the ability to access table storage via an abstract interface to a table adapter, which may reduce dependencies on specific types of storage/persistence layers (which may enable use with different types of storage/persistence layers).

In some example embodiments, the database execution engine 150 may be provided with at least one table adapter. In some example embodiments, the table adapter may generate an object, such as a table object, which can be stored in cache with other code, objects, and/or the like awaiting runtime execution of the query. In some example embodiments, and the table object can be opened, during query execution, to provide access to a table stored in the persistence layer of a database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system, comprising:
   at least one data processor; and
   at least one memory storing instructions that, when executed by the at least one data processor, result in operations comprising:
   receiving a query including a request to join first data from a first dimension table and second data from a second dimension table with fact data from a fact table, the query further including:
   a first predicate including a first expression associated with the first data and a first reference to a first column associated with the fact data from the fact table,
   a second predicate including a second expression associated with the second data and a second reference to a second column associated with the fact data from the fact table, and
   a third predicate for use in a table scan of the fact table;
   applying a first dynamic predicate associated with the first dimension table to at least the first data by at least:
   collecting the first data based on the first expression, wherein collecting the first data comprises parallelizing the first data and merging the first data by uniquifying the first data after collecting the first data, and
   filtering the first column based on a first value identifier mapped to at least one vector of data representing the collected first data, wherein uniquifying the first data comprises removing duplicate values from the at least one vector of data representing the collected first data, the first dynamic predicate including a transformation of the first predicate for execution of the query;
   applying a second dynamic predicate associated with the second dimension table to at least the second data by at least:
   collecting the second data based on the second expression, wherein collecting the second data comprises parallelizing the second data and merging the second data by uniquifying the second data after collecting the second data, and
   filtering the second column based on a second value identifier mapped to at least one vector of data representing the collected second data, wherein uniquifying the second data comprises removing duplicate values from the at least one vector of data representing the collected second data, the second dynamic predicate including a transformation of the second predicate for execution of the query; and
   executing the query by at least scanning the fact table based on the first predicate, the second predicate, the first filtered column, and the second filtered column.

2. The system of claim 1, wherein the operations further comprise: transforming the first predicate into the first dynamic predicate by at least converting the first predicate to a first child node of the table scan; transforming the second predicate into the second dynamic predicate by at least converting the second predicate to a second child node of the table scan, and wherein the table scan is configured to perform the scanning of the fact table.

3. The system of claim 2, wherein the transforming further comprises: including the first predicate as a child node of the table scan in conjunction with the first dynamic predicate; and including the second predicate as another child node of the table scan in conjunction with the second dynamic predicate.

4. The system of claim 1, wherein the filtering the first column comprises removing, from the fact table, at least one row that does not correspond to the first value identifier, and wherein the filtering the second column comprises removing, from the fact table, at least one row that does not correspond to the second value identifier.

5. The system of claim 1, wherein the first dynamic predicate and the second dynamic predicate are implemented as a semi-join reduction to reduce a number of rows in at least the fact table for use in the scanning of the fact table.

6. A computer-implemented method comprising:
receiving a query including a request to join first data from a first dimension table and second data from a second dimension table with fact data from a fact table, the query further including:
a first predicate including a first expression associated with the first data and a first reference to a first column associated with the fact data from the fact table,
a second predicate including a second expression associated with the second data and a second reference to a second column associated with the fact data from the fact table, and
a third predicate for use in a table scan of the fact table;
applying a first dynamic predicate associated with the first dimension table to at least the first data by at least:
collecting the first data based on the first expression, wherein collecting the first data comprises parallelizing the first data and merging the first data by uniquifying the first data after collecting the first data, and
filtering the first column based on a first value identifier mapped to at least one vector of data representing the collected first data, wherein uniquifying the first data comprises removing duplicate values from the at least one vector of data representing the collected first data, the first dynamic predicate including a transformation of the first predicate for execution of the query;
applying a second dynamic predicate associated with the second dimension table to at least the second data by at least:
collecting the second data based on the second expression, wherein collecting the second data comprises parallelizing the second data and merging the second data by uniquifying the second data after collecting the second data, and
filtering the second column based on a second value identifier mapped to at least one vector of data representing the collected second data, wherein uniquifying the second data comprises removing duplicate values from the at least one vector of data representing the collected second data, the second dynamic predicate including a transformation of the second predicate for execution of the query; and
executing the query by at least scanning the fact table based on the first predicate, the second predicate, the first filtered column, and the second filtered column.

7. The method of claim 6, wherein the method further comprises: transforming the first predicate into the first dynamic predicate by at least converting the first predicate to a first child node of the table scan; transforming the second predicate into the second dynamic predicate by at least converting the second predicate to a second child node of the table scan, and wherein the table scan is configured to perform the scanning of the fact table.

8. The method of claim 7, wherein the transforming further comprises: including the first predicate as a child node of the table scan in conjunction with the first dynamic predicate; and including the second predicate as another child node of the table scan in conjunction with the second dynamic predicate.

9. The method of claim 6, wherein the filtering the first column comprises removing, from the fact table, at least one row that does not correspond to the first value identifier, and wherein the filtering the second column comprises removing, from the fact table, at least one row that does not correspond to the second value identifier.

10. The method of claim 6, wherein the first dynamic predicate and the second dynamic predicate are implemented as a semi-join reduction to reduce a number of rows in at least the fact table for use in the scanning of the fact table.

11. A non-transitory computer-readable medium storing instructions, which when executed by at least one data processor, result in operations comprising:
receiving a query including a request to join first data from a first dimension table and second data from a second dimension table with fact data from a fact table, the query further including:
a first predicate including a first expression associated with the first data and a first reference to a first column associated with the fact data from the fact table,
a second predicate including a second expression associated with the second data and a second reference to a second column associated with the fact data from the fact table, and
a third predicate for use in a table scan of the fact table;
applying a first dynamic predicate associated with the first dimension table to at least the first data by at least:
collecting the first data based on the first expression, wherein collecting the first data comprises parallelizing the first data and merging the first data by uniquifying the first data after collecting the first data, and filtering the first column based on a first value identifier mapped to at least one vector of data representing the collected first data, wherein uniquifying the first data comprises removing duplicate values from the at least one vector of data representing the collected first data, the first dynamic predicate including a transformation of the first predicate for execution of the query;

applying a second dynamic predicate associated with the second dimension table to at least the second data by at least:

collecting the second data based on the second expression, wherein collecting the second data comprises parallelizing the second data and merging the second data by uniquifying the second data after collecting the second data, and filtering the second column based on a second value identifier mapped to at least one vector of data representing the collected second data, wherein uniquifying the second data comprises removing duplicate values from the at least one vector of data representing the collected second data, the second dynamic predicate including a transformation of the second predicate for execution of the query; and executing the query by at least scanning the fact table based on the first predicate, the second predicate, the first filtered column, and the second filtered column.

12. The non-transitory computer-readable medium of claim 11, wherein the operations further comprise: transforming the first predicate into the first dynamic predicate by at least converting the first predicate to a first child node of the table scan; transforming the second predicate into the second dynamic predicate by at least converting the second predicate to a second child node of the table scan, and wherein the table scan is configured to perform the scanning of the fact table.

13. The non-transitory computer-readable medium of claim 12, wherein the transforming further comprises: including the first predicate as a child node of the table scan in conjunction with the first dynamic predicate; and including the second predicate as another child node of the table scan in conjunction with the second dynamic predicate.

* * * * *